United States Patent [19]
Studtmann

[11] 3,908,158
[45] Sept. 23, 1975

[54] CONTROL SYSTEM FOR ADJUSTING A-C MOTOR SPEED AT LINE FREQUENCY OR A SUBHARMONIC OF THE LINE FREQUENCY

[75] Inventor: George H. Studtmann, Mount Prospect, Ill.

[73] Assignee: Borg-Warner Corporation, Chicago, Ill.

[22] Filed: Sept. 16, 1974

[21] Appl. No.: 506,639

Related U.S. Application Data

[63] Continuation of Ser. No. 364,441, May 9, 1973, abandoned, which is a continuation of Ser. No. 174,597, Aug. 25, 1971, abandoned.

[52] U.S. Cl. ............... 318/227; 321/66; 318/230; 318/231; 318/171
[51] Int. Cl. ............................................. H02p 5/40
[58] Field of Search ...... 321/66; 318/227, 230, 231, 318/171

[56] References Cited
UNITED STATES PATENTS

| | | | |
|---|---|---|---|
| 3,297,937 | 1/1967 | Benchimol | 321/66 |
| 3,307,094 | 2/1967 | Ogle | 318/227 |
| 3,329,887 | 7/1967 | Schaeve | 323/22 |
| 3,579,086 | 5/1971 | Lebenbaum | 321/66 |

*Primary Examiner*—B. Dobeck
*Attorney, Agent, or Firm*—James J. Jennings

[57] ABSTRACT

Speed control of an a-c motor is accomplished with back-to-back thyristors coupled between the power line and the motor. A gate circuit (1) selects which of the thyristors can be gated on, and (2) determines the actual time of thyristor conduction in each half-cycle. In turn the gate circuit is regulated, as to thyristor selection, by a countdown arrangement including frequency control and multivibrator circuits. The gate circuit is also regulated, to determine the actual conduction time, by a voltage control circuit coupled to the frequency control circuit. Thus the frequency control circuit regulates motor speed as a function either of the fundamental power line frequency, or a subharmonic of the line frequency.

8 Claims, 9 Drawing Figures

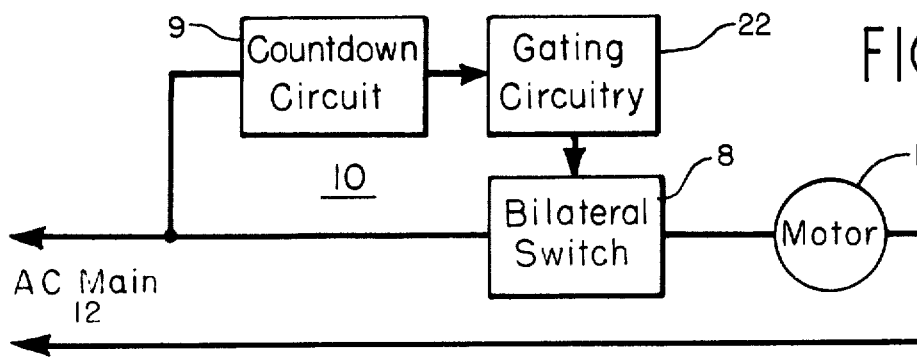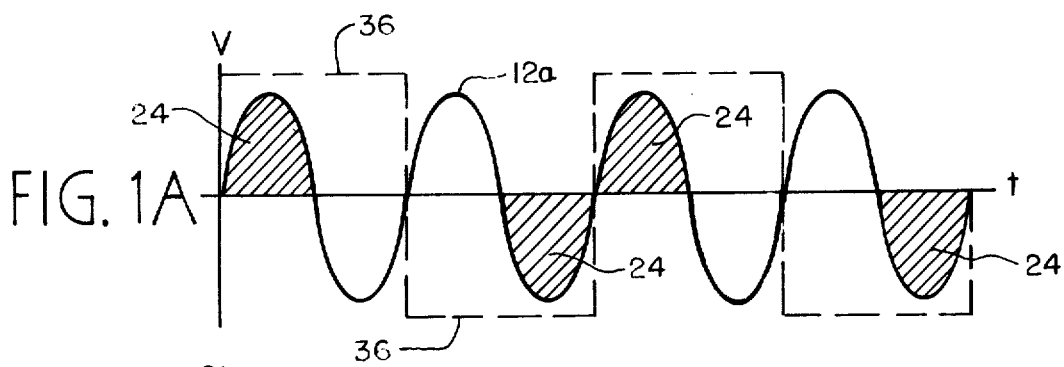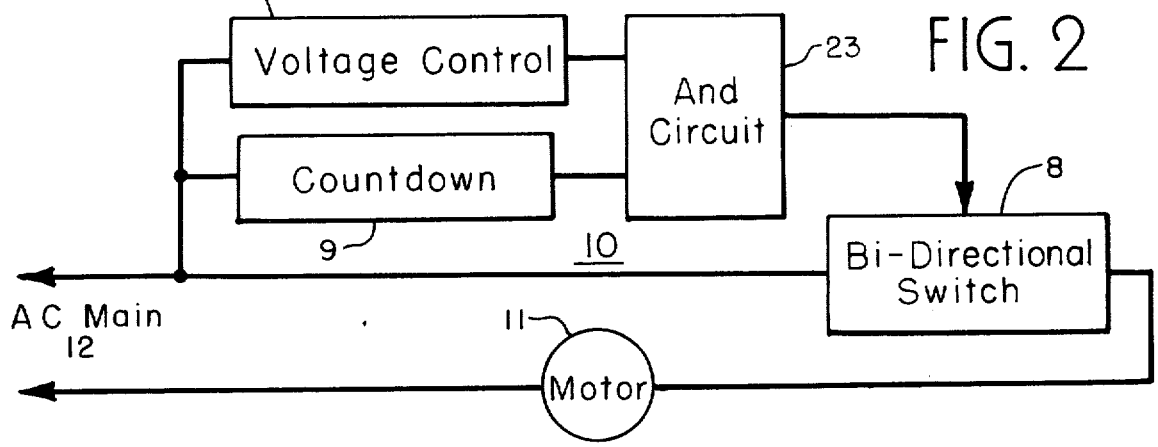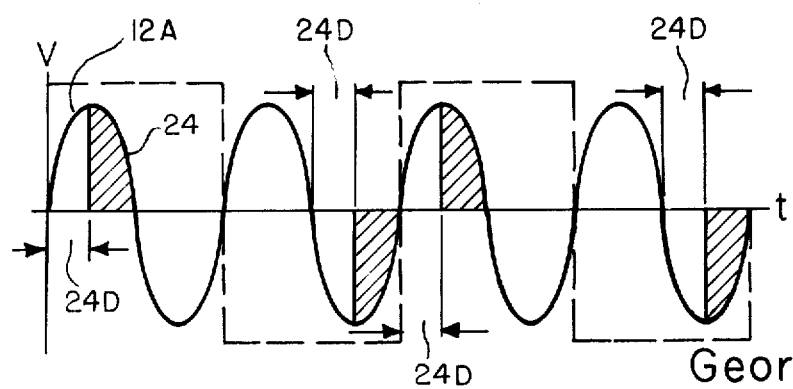

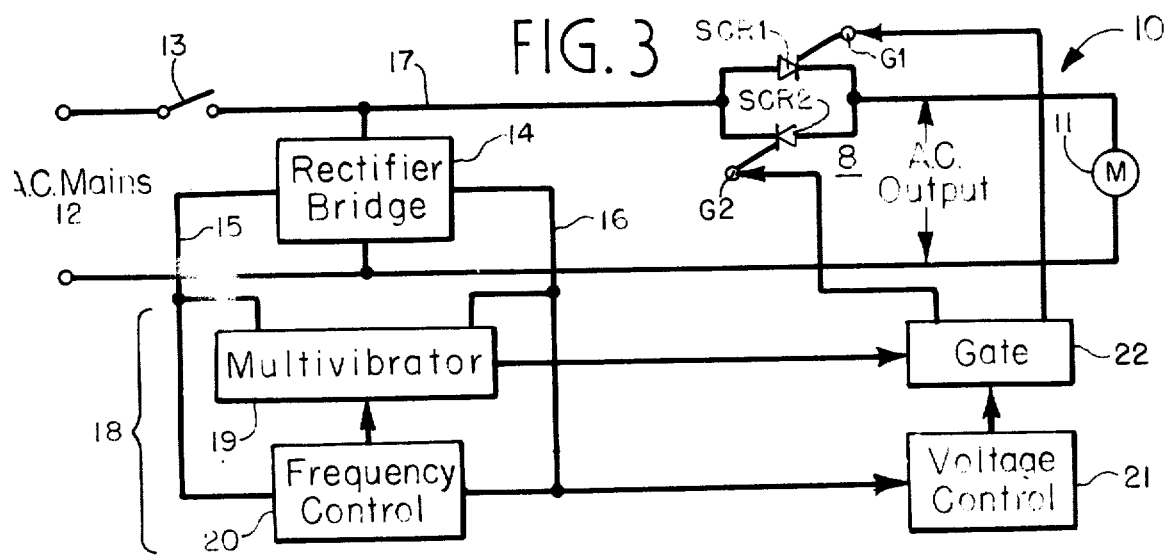
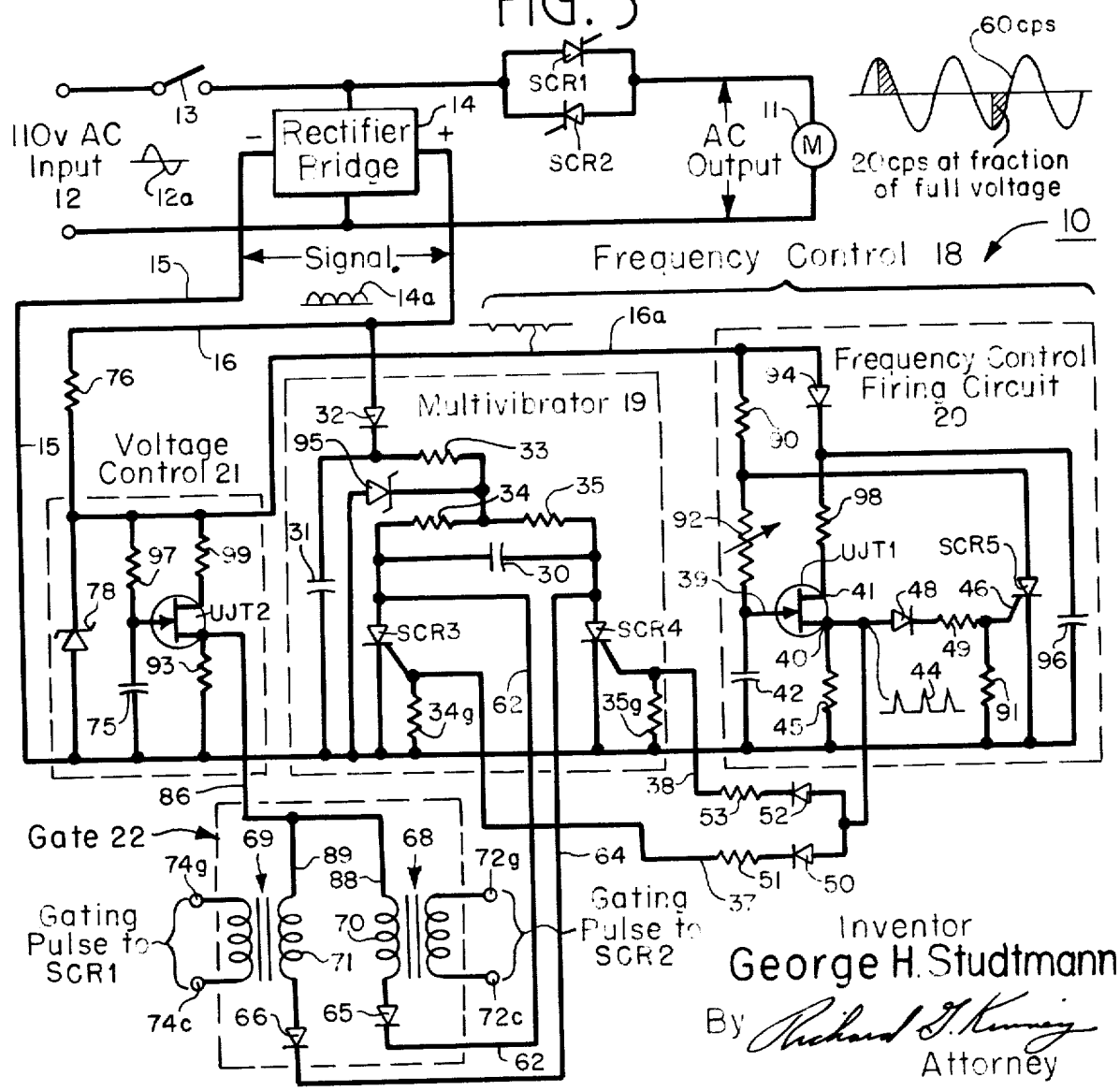
Inventor
George H. Studtmann
By Richard T. Kenney
Attorney

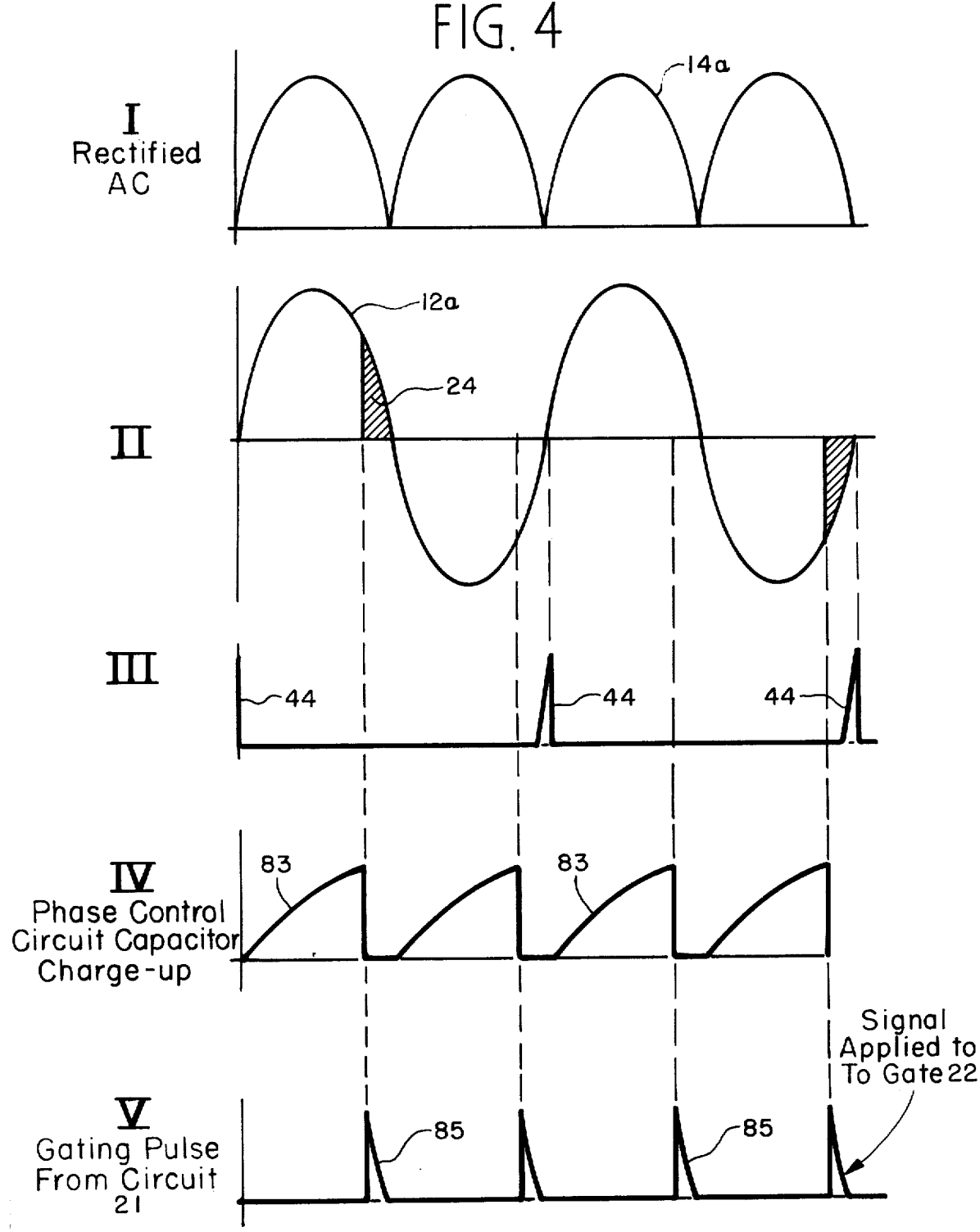

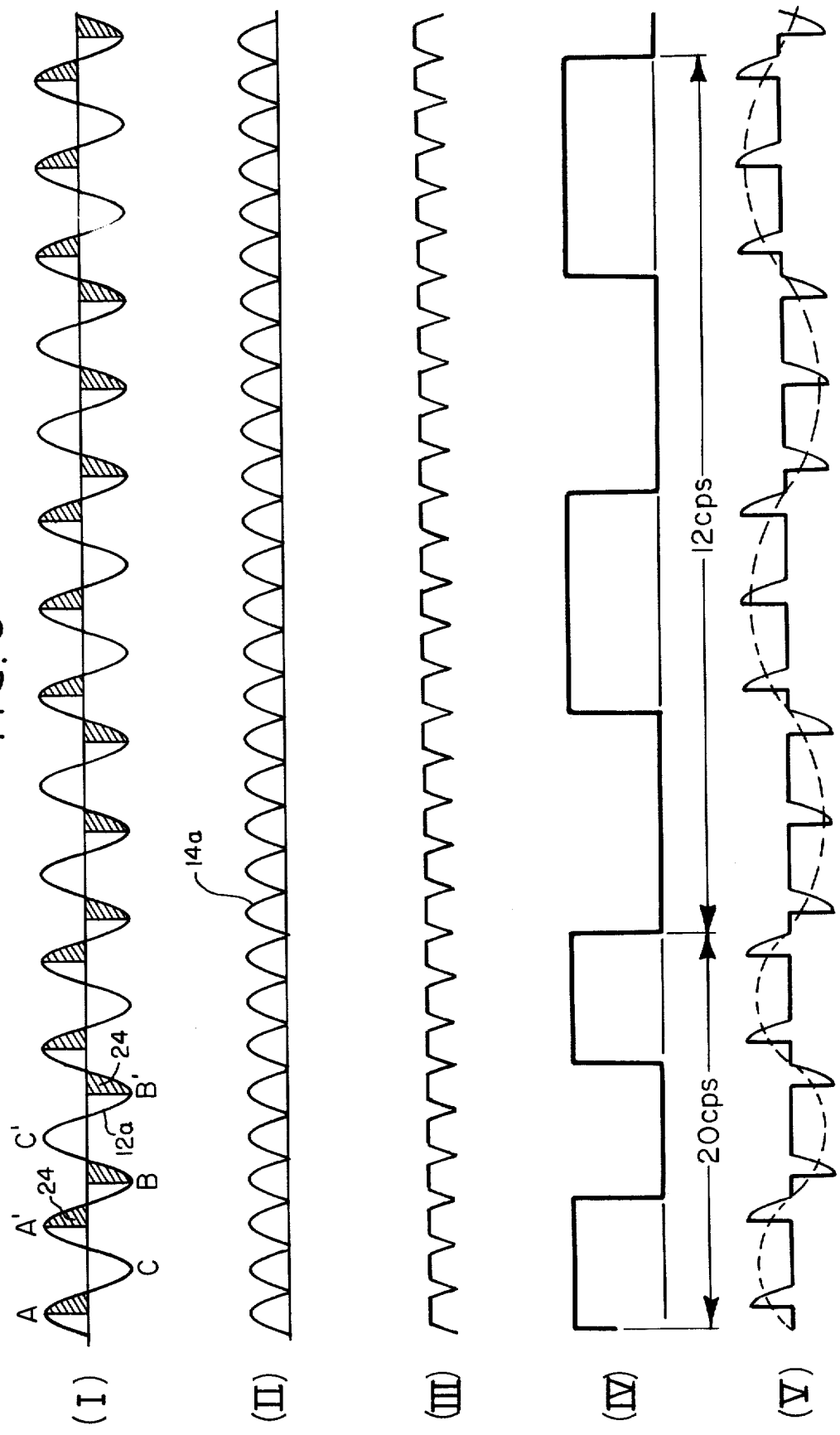

3,908,158

CONTROL SYSTEM FOR ADJUSTING A-C MOTOR SPEED AT LINE FREQUENCY OR A SUBHARMONIC OF THE LINE FREQUENCY

This application is a continuation of a prior application entitled "CONTROL SYSTEM FOR ADJUSTING SPEED OF A.C. MOTOR," Ser. No. 364,441, filed May 9, 1973, now abendoned, which prior application was a continuation of an earlier application with the same title, Ser. No. 174,597, filed Aug. 25, 1971, now abandoned. Both the prior and earlier applications are in the name of the same inventor, and assigned to the same assignee, as this application.

BACKGROUND OF THE INVENTION

In the control of a-c electrical motors by control of the energy supplied to the stator, one of two techniques is generally used to vary the motor's speed: adjusting the voltage amplitude, while keeping the frequency of the a-c power supply fixed; or adjusting the frequency of that power. It is common in frequency-adjusting control systems to also vary the amplitude of the applied voltage so as to provide what is known as a constant torque system.

The constant-frequency, variable-voltage-amplitude system has the advantages of achieving good, if limited, control, and simple and economic construction. However, it has the disadvantages of limited range of speed variation and low efficiencies at the extremes of that range when compared to the frequency-adjusting system. This latter provides technically excellent control, over wide ranges of speed and at good operating efficiencies, but at a considerable cost and complexity of equipment.

The present invention has as its primary purpose to provide a simple system that has many of the advantages of both these systems.

SUMMARY OF THE INVENTION

This invention includes an a-c motor speed control system for an a-c motor connected for energization from an a-c power line supplying power at a fundamental line frequency. The system comprises a bidirectional switch, coupled between the power line and the motor, and control means coupled both to the power line and to the bidirectional switch. This control means includes a countdown circuit, coupled to and synchronized with the power line, connected to control the gating of the bidirectional switch at a gating frequency that is equal to or a subharmonic of, the fundamental line frequency. The countdown circuit further includes a voltage control circuit, also coupled to and synchronized with the power line, to control the gating of the bidirectional switch for all, or a variable amount less than all, of each individual half-cycle of energy at the gating frequency determined by the bidirectional switch.

THE DRAWINGS

FIG. 1 is a block diagram of an a-c motor speed control system, constructed in accordance with the present invention;

FIG. 1A is a graph of voltage and gating versus time, useful in explaining the operation of the system of FIG. 1;

FIG. 2 is a block diagram in more detail of a system, similar to that of FIG. 1, constructed in accordance with the present invention;

FIG. 2A is a graph, similar to that of FIG. 1A, useful in explaining the operation of the system in FIG. 2;

FIG. 3 is a block diagram, partly in circuit form, of the embodiment of FIG. 2;

FIG. 4 is a set of graphs of voltages versus time which are useful in explaining the operation of the system of FIG. 3;

FIG. 5 is a detailed circuit diagram of the system of FIG. 3;

FIG. 6 is a graphical representation of the voltage-time relationship at different points of the system of FIGS. 3 and 5, which graphs are useful in understanding the operation of the system and its operation in changing between different subharmonic frequencies.

GENERAL DESCRIPTION

Figure 7:
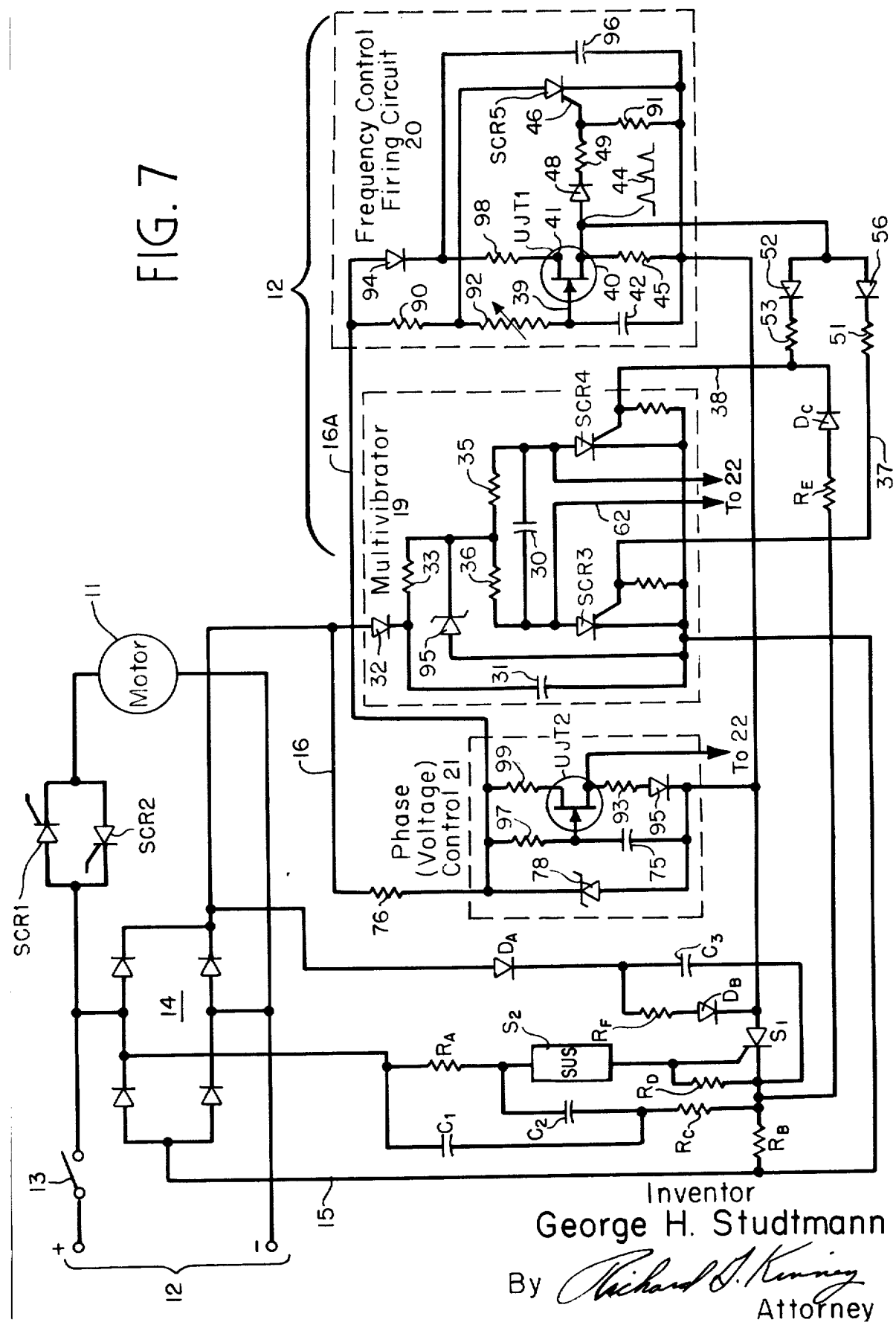
FIG. 7 is a circuit diagram of another embodiment of the system.

One major feature of the present invention lies in the realization that an a-c motor can be made to operate at subharmonic frequencies of an a-c mains frequency by means of very simple circuitry, and that extended speed ranges of the order of 6/1; or better are attainable with circuitry vastly simpler than used in conventional inverter or converter systems.

In the teaching of this invention the system is generally designated 10, as schematically shown as in FIG. 1. A single bilateral switch 8 is controlled by means, shown as a countdown cicuit 18, for controlling the gating of selected negative and positive portions of the a-c power from mains 12 to an a-c motor 11. As used herein and in the claims the term "countdown circuit" means a scale-down divide-down circuit, also termed a scaling circuit, and equivalents. A general discussion of such circuits may be found at p. 155 of Susskind, *Encyclopedia of Electronics* (Reinhold), and at p. 49 of Vol. 12 of the *McGraw-Hill Encyclopedia of Science and Technology*. The bilateral switch 8 may be composed of thyristors, triacs, transistors or the like. The countdown unit 18 essentially counts down an integral number of half-cycles of the line frequency, and causes appropriate gating circuitry to gate on the positive and negative half-cycles of the line frequency to the motor for respective lengths of time corresponding to half-periods of the desired output frequency.

Reference to FIG. 1A will make this clearer. In that figure one example of the operation is illustrated. The shaded portions 24 of the input voltage waveshape 12a represent the voltage applied to the motor by such an arrangement. The dashed line waveform 36 indicates the fundamental gating frequency established for the motor. In this case, a two to one frequency reduction is illustrated, resulting in a speed reduction of one-half that which would be obtained by applying power at the fundamental line frequency.

Those skilled in the art will appreciate that it is generally necessary to control voltage amplitude as well as frequency, and to this end a modification of system 10 depicted in FIG. 2 incorporates a voltage control unit 21. The voltage control unit 21 derives information from the a-c line, and these signals, combined with the output of the countdown unit in AND circuit 23, produce the appropriate trigger signals for the bidirectional switch 8. The net result is an output voltage where average voltage amplitude may be controlled. FIG. 2A illustates waveshapes so obtained. As is evident from FIG. 2A, the amount of line voltage (pulses 24) actually applied to the motor has been reduced by a delay (indicated by the distance 24D) in the triggering of the thyristors during the respective cycles.

In effect, the voltage amplitude control is phase control which is selectively applied to the appropriate half-cycles to obtain the desired result. This is in contrast to an ordinary phase control system, which gates on an SCR or the like in each half-cycle.

There are many ways to implement the system just described, and the following detailed description indicates but one approach to the problem. The hereinafter described specific example is the presently contemplated best mode of practicing the invention. However, those skilled in this art will realize that this is not the only way to achieve the desired results. It is emphasized that the present invention, at least in its broader aspects, encompasses the method and system regardless of the particular means employed and it is the intent of at least the broader of the appended claims to claim this system and method.

DETAILED DESCRIPTION OF THE INVENTION

Shown in FIG. 3 is more detail is one embodiment of the system 10 for energizing the electric a-c motor 11 from the a-c power line 12. The a-c power signal may be a sine wave 12a as shown in Graph II of FIG. 4. A main control switch 13 couples the a-c power line to a rectifier bridge 14. The latter provides a rectified voltage represented by waveform 14a, as depicted in Graph I of FIG. 4, across a pair of output lines 15, 16. As is explained subsequently, a full-wave rectified a-c signal, rather than a smoothed or filtered d-c signal, is supplied from the bridge 14 for purposes of synchronization. That is, the pulses of the signal 14a are used to synchronize the operation of a pair of thyristors, shown as silicon-controlled rectifiers SCR 1 and SCR 2, used in the present system to control energy flow to the load 11.

The silicon-controlled rectifier SCR 1 has its anode coupled to the a-c line by a line 17, and is responsive to a positive voltage on its anode and a gate signal at its gate G1 to permit energy flow to the load. The second silicon-controlled rectifier, SCR 2, has its cathode coupled by the same line 17 to the a-c power line, and is responsive to a negative voltage applied to line 17 and a gating pulse at its gate G2 to permit energy flow to the load 11. The frequency and voltage amplitude of the a-c power applied to load 11 is controlled by firing the silicon-controlled rectifiers SCR 1 and SCR 2, at the proper times while the a-c line voltage 12a alternates at a predetermined fundamental line frequency, such as 60 hz.

The lines 15, 16 from the bridge 14 couple the signal 14a (FIG. 4, Graph I) to a countdown circuit 18 for providing the gating pulses. The circuit 18 includes a multivibrator 19 of the flip-flop type for producing pulses in response to signals received from a frequency control firing circuit 20. The multivibrator 19 operates in conjunction with the frequency control 20 to regulate the basic frequency of the voltage applied to the motor windings. The multivibrator 19 alternately passes firing signals through gate circuit 22 to gate $G_1$ or $G_2$, at the command of the frequency control circuit 20. Thus the number of positive half-cycles of the source voltage applied to the motor 11 is determined by how long the multivibrator remains in one state, and subsequently the number of negative half-cycles passed to the motor is determined by the time the multivibrator spends in its other state. The period of the multivibrator is controlled by the frequency control circuit 20, which thus determines the output frequency of the voltage applied to the motor.

A voltage control circuit 21 is provided which is coupled to the frequency control circuit 20 and is responsive thereto. The voltage control circuit 21 functions to determines the precise time, in each half-cycle of the supply voltage waveshape to be coupled to the motor 11, at which the SCRs are fired. Signals derived from this circuit 21 are applied to gate circuit 22, which directs them to the proper SCR at the discretion of the enabling signal obtained from multivibrator 19.

Thus, the idealized output signal (neglecting motor inductance effects) as shown in Graph II of FIG. 4 results in a frequency reduction of two to one.

Referring to FIG. 5, the system 10 of FIG. 3 is there depicted in more detail. And, as can there be seen, the multivibrator 19 of the countdown circuit 18, as an example, includes a pair of silicon-controlled rectifiers SCR 3 and SCR 4 having their anodes connected through a commutating capacitor 30. The multivibrator is coupled across conductors 15, 16 to receive the rectified signal 14a, and the cathodes of the SCR's 3 and 4 are connected in common to the line 15. A filtering capacitor 31 connected to line 15 is provided, as well as isolation diode 32 connected in series therewith and to the line 16. Current limiting and biasing resistors 33, 34, 35 are provided and connected in a Y between the junction of the cathode of the diode 32 and the capacitor 31 and the anodes of the SCR's 3 and 4. For gating or firing the SCR's 3 and 4 to provide an output signal, conductors 37, 38 are connected, respectively, to the gate of SCR 3 and to the gate of SCR 4, and to the frequency control firing circuit 20. Gate current limiting resistors 34g and 35g are respectively connected from the gates of SCR's 3 and 4 to the line 15.

The frequency control circuit 20 includes a unijunction transistor UJT 1 having an emitter 39, a base-one 40, and a base-two 41. Operating bias for the unijunction transistor UJT 1 is provided by a rectifying diode 94 whose cathode is connected to one side of a smoothing capacitor 96, whose other side is connected to the line 15. This smoothed d-c potential across the capacitor 96 is connected to the base-two 41 of the transistor UJT 1 through a current limiting resistor 98. The unijunction transistor UJT 1 is responsive to charge-up of a timing capacitor 42 which is connected between the emitter 39 and line 15. A biasing resistor 45 connects base-one of the unijunction transistor UJT 1 to line 15. A charging path for the capacitor 42 is completed from an input line 16a to the circuit 20 through a fixed resistor 90 and a variable resistor 92 connected in series to the emitter 39. As is well known to those skilled in this art, when the voltage applied between the emitter 39 and base-one 40 elements of the unijunction transistor exceeds the peak point voltage of the unijunction transistor, as determined by the voltage applied across the base-one 40 and the base-two 41 terminals, the unijunction transistor becomes conductive between the emitter and the base-one connections. As a result, the capacitor 42 discharges periodically through the emitter-base-one circuit of UJT 1, and produces a series of pulses 44 (FIG. 4, Graph III) across the resistor 45.

To synchronize the initiation of charge-up of the capacitor 42 with the beginning of a half-cycle of the supply line voltage, the charging circuit including resistor 92 and capacitor 42 is coupled across a silicon-controlled rectifier SCR 5, which has its anode connected to the junction of resistors 90 and 92 and its cathode connected to the line 15. The latter is biased for conduction by the rectified signal 14a, and gate 46 of the SCR 5 is coupled through a diode 48 and a resistor 49 to the UJT base-one 40 to receive the pulse signal 44. The gate 46 is also connected through a gate shunting resistor 91 to the line 15. Thus, the capacitor 42 is prevented from charging-up until SCR 4 (having been turned "on" by a pulse 44) is turned "off", which occurs when the forward bias is removed at the end of a rectified half-cycle of the signal 14a. The pulse across the resistor 45 is coupled to the gates of SCR 3 and SCR 4 respectively, in the multivibrator circuit 19, by respective series networks including a diode 50 and resistor 51 to line 37, and a diode 52 and resistor 53 to line 38. The result of these pulses 44 is to change the state of the flip-flop 19.

In more detail, assume that one of the SCR's 3 and 4 is on, for example SCR 3, and that capacitor 30 is charged. The next subsequent pulse 44 turns on the other silicon-controlled rectifier, SCR 4, which results in connection of the positively charged end of commutating capacitor 30 to the rectified source negative terminal, conductor 15, thereby applying a negative bias to SCR 3, as a result commutating the latter off. The result is that SCR 4, which has just been turned on, continues to conduct, the capacitor 30 thereby discharging and suubsequently charging to a reverse polarity. The cycle repeats when the next pulse 44 is received, whereupon the first silicon-controlled rectifier, SCR 3, is again turned on, and the positively charged end of the capacitor is brought to ground, thereby commutating off SCR 4. As either one of the silicon-controlled rectifiers SCR 3 of SCR 4 is turned on, the potential at the anode of that silicon-controlled rectifier drops to a nominal one volt level.

Whenever either SCR 3 or SCR 4 is off, the voltage at its respective anode is some relatively high value, causing either diode 65 or 66 respectively to be reverse biased, and disabling such diode from conducting. When, however, either SCR 3 or SCR 4 is triggered into conduction, the disabling voltage is removed and the respective diode 65 or 66 is thus enabled to conduct. Thus, at the reception of each pulse 44 from the frequency control circuit 20, the multivibrator 19 changes state, cqusing a corresponding change in the gate circuit 22 that determines which SCR (1 or 2) is enabled. The frequency control circuit 20 is synchronized to the line, hence the multivibrator changes in state are likewise synchronized to the line.

As herein illustrated, the signals from the multivibrator circuit are fed to gate circuit 22 over a pair of conductors 62, 64. The gate circuit 22 includes a pair of diodes 65 and 66 whose cathodes are connected respectively to the lines 62 and 64, and whose anodes are respectively connected to one end of the primary coils 70, 71 of a pair of transformers 68 and 69. The other ends of the primary coils 70, 71 are connected in common via, respectively, a line 88 and a line 89. The transformers have respective secondaries 72, 74 and, as will be subsequently described, the voltage applied to each side of the diodes must forward bias the latter for a pulse to appear across the respective transformer secondaries 72, 74. To apply a gating pulse to the main silicon-controlled rectifiers, SCR 1 and SCR 2, the secondary 72 has a pair of terminals 72g, 72c, connected to the gate and cathode respectively of SCR 1, and the secondary 74 has a pair of terminals 74g, 74c, connected to the gate and cathode respectively of the other SCR 2.

A signal is applied to the other side of the diodes 65, 66, by the voltage control circuit 21. Describing the latter, a unijunction transistor UJT 2 has its emitter connected to a timing capacitor 75 and its base-one connected to a line 86. The base-one of the UJT 2 is connected to line 15 through the series connection of a resistor 93. The UJT 2 is connected across the rectified signal lines 15, 16 with a voltage dropping resistor 76 having one end connected to the line 16. A Zener diode 78 has its cathode connected to the other end of the resistor 76 and its anode connected to the line 15.

The charging circuit for timing capacitor 75 includes aa variable resistor 97 connected between the cathode of the diode 78 and the emitter of UJT 2. A unijunction transistor biasing network includes the resistor 99 connected from the cathode of the diode 78 to base-two of UJT 2. The bias voltage applied to base-one and base-two of UJT 2 determines the peak point voltage which must be applied between the emitter and the base-one to bias this junction of the transistor to conduction. The capacitor 75 coupled across the latter junction charges as represented by a sawtooth waveform 83, Graph IV of FIG. 4, and when it charges up to the peak point voltage, a discharging circuit is provided through UJT 2. As a result, a series of voltage pulses 85 (Graph V of FIG. 4) result and are developed across resistor 93. The conductor 86 connected to base-one of the transistor UJT 2 couples the voltage control circuit 21 to the gate circuit 22.

Within the gate circuit 22 the conductor 86 connects to the pair of branches 88, 89, each of which is coupled to one of the ends of the respective transformer primaries 70, 71. The other ends of the primaries of the pulse transformers, are respectively connected to the anodes of one of the diodes 65, 66. Accordingly, if the gate circuit receives a pulse from voltage control circuit 21, and at the same time no signal (nominally 1 volt = zero) is present on the other side of the respective diodes 65, 66, from the multivibrator 19 so that the potential across the diode is such as to bias the diode for conduction, a pulse is fed out of one of the transformer secondaries 72, 74. As a result that one of the main silicon-controlled rectifiers, SCR 1 or SCR 2, which at that time is forward biased, is gated on and energy flows to load 11. The shaded portion of a-c source signal 12a (FIG. 4, Graph II), represented by reference character 24, is the output signal applied to the load.

It has been assumed in the above discussion that inductive effects were sufficiently small in the motor to allow proper operation with only a pulse applied to the gate of either SCR 1 or 2 to initiate conduction. That is, once the SCR has received a gate signal it is assumed that the anode was already forward biased and that the SCR would conduct. If in some systems this is not the case, then it would be necessary to extend to duration of the gate signal. To those skilled in the art this is not a particular challenge and gate drivers such as disclosed in U.S. Pat. No. 3,656,047, issued Apr. 11, 1972 in the names of Yarema and Studtmann, and assigned to the same assignee as the present invention, may be used for this purpose as one illustrative example.

In FIG. 6 the operation of the system 10 at two different subharmonic frequencies, 20 and 12 hz, of a fundamental line frequency of 60 hz, is depicted. In that figure, Graph I represents the 60 hz sine wave power signal 12a on the a-c line, and the output pulses are designated 24. Graph II shows the full wave rectified output 14a of the power signal 12a. This rectified output signal 14a is produced across the lines 15 and 16 of FIG. 5. Graph III of FIG. 6 represents the signal resulting across the lines 16a and 15 because of the breakdown of the Zener diode 78. The momentary excursions to zero volts serve to synchronize the frequency and voltage control circuits.

Graph IV represents one of the output signals from the multivibrator 19 (neglecting commutation spikes). This signal determines which controlled rectifier SCR 1 or SCR 2 can be gated on to pass all or part of tha positive or negative portion of the power signal of Graph I to the motor 11. As can be seen from inspection of Graph IV, two rates of switching, one covering three of the power source fundamental cycles per square wave flip-flop output cycle for producing an effective 20 hz output load signal, and another covering five of the power source fundamental cycles per load signal to produce an effective 12 hz output square wave flip-flop output cycle, are shown. The resulting output load signal is depicted in Graph V in solid lines and the effective signal "seen" by the motor 11 is shown on that graph in dashed lines.

STARTING PROBLEM

Reference to FIG. 6 for the 20 hz signal shows that there are really two possible voltage patterns that may be applied to the motor by the circuitry just described. That is, referring to Graph I, an alternate 20 hz pattern would be to allow half cycles designated C and C' to be developed across the motor and blank out A, A' and B, B'. The circuit presented will not distinguish between these two alternatives but the addition of appropriate starting circuitry will allow the proper choice to be made.

Referring to FIG. 7, the circuit of FIG. 5 is there shown modified by the addition of starting circuitry.

A silicon-controlled rectifier, designated $S_1$, is employed to turn on the frequency control and voltage control circuits at an appropriate instant. The firing of the SCR $S_1$ is controlled by the triggering of a silicon unilateral switch (SUS) designated $S_2$. The voltage which triggers the SUS $S_2$ is the sum of the differentiated voltage across one of the diodes in bridge 14 and the charging voltage of capacitor $C_2$. Capacitor $C_1$ and resistor $R_C$ form a differentiation network which provides pulses with a sharp leading edge at the beginning of a cycle, making $S_1$ forward biased. This pulse is developed across resistor $R_C$ and added to the voltage across capacitor $C_2$, which voltage is slowly increasing. At the time that the sum of these voltages equals the triggering voltage of the SUS, the latter will turn on the fire SCR $S_1$. The firing of SCR $S_1$ applies energy to the voltage control, multivibrator and frequency control circuits and initiates their action. The flow of current through $R_B$ develops a gating signal which is passed over resistor $R_F$ and diode $D_C$, to trigger SCR 4 in mutivibrator 19, which sets the state of the flip-flop 19 to enable to gate of SCR 1.

The insure the the SCR $S_1$ stays on during the time that the full wave rectified voltage decreases to zero, a network consisting of a first diode $D_A$, a capacitor $C_3$, a resistor $R_F$ and a secon diode $D_B$ is added. Capacitor $C_3$ is charged through diode $D_A$ from the input diode bridge 14. Resistor $R_F$ supplies holding current to SCR $S_1$ from capacitor $C_3$ insuring it stays on once fired. In this manner the circuit may be started in the desired mode.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled."

While only particular embodiment of the invention have been described and claimed herein, it is apparent that various modifications and alterations of the invention may be made. It is therefore the intention in the appended claims to cover all such modifications and alterations as may fall within the true spirit and scope of the invention.

What is claime is:

1. an a-c motor speed control system for an a-c motor connected for energization from an a-c power line supplying power at a fundamental line frequency, comprising:

a bidirectional switch coupled between the power line and the motor, and control means coupled both to the poweer line and to the bidirectional switch, which control means includes a countdown circuit coupled to and synchronized with the power line, connected to control the gating of the bidirectional switch at a gating frequency that is equal to, or a subharmonic of, the fundamental line frequency, and a voltage control circuit, also coupled to and synchronized with the power line to control the gating of the bidirectional switch for all, or a variable amount less than all, of each individual half cycle of energy at the gating frequency determined by the bidirectional switch.

2. An a-c motor speed control system as claimed in claim 1, in which said bidirectional switch includes first and second unidirectional switches, each of which has a control terminal and operates responsive to receipt of a signal at such terminal to pass only positive or only negative portions of the a-c energy on the power line, and in which the countdown circuit includes a multivibrator having two output connections, one of which is coupled to the control terminal of the first unidirectional switch and the other of which is coupled to the control terminal of the second unidirectional switch, and the countdown circuit further includes a frequency control circuit, coupled both to the multivibrator and to the a-c power line, connectd to sequentially set and reset said multivibrator to produce at the multivibrator output connections changes in state for successive periods corresponding to a whole number of half cycles equal to or greater than two.

3. An a-c motor speed control system as claimed in claim 2, in which the control means includes a full wave rectifier, coupled to the a-c power line and having its output coupled both to the multivibrator and to the frequency control circuit, for providing both supply power and synchronization to said countdown unit.

4. An a-c motor speed control system as claimed in claim 2, in which the bidirectional switch comprises a pair of thyristors connected in parallel with one anode connected to the others cathode.

5. An a-c motor speed control system for an a-c motor connected for energization from an a-c power line supplying power at a fundamental line frequency, comprising:
   a single bidirectional switch between the power line and the motor,
   a gate circuit, coupled to the bidirectional switch, operable to regulate the bidirectional switch both as to the direction and the amount of power transfer between the a-c power line and the motor,
   a countdown circuit, coupled to and synchronized with the power line, connected to control the gate circuit to regulate the direction of power transfer at a gating frequency that is equal to, or a subharmonic of, the fundamental line frequency, and
   a voltage control circuit, also coupled to and synchronized with the power line, connected to control the gate circuit to regulate the amount of power transfer by passing all, or a variable amount less than all, of each individual half cycle of power of the gating frequency determined by the countdown circuit.

6. An a-c motor speed control system as claimed in claim 5, in which the single bidirectional switch includes a pair of thyristors connected back to back, such that conduction of one thyristor passes power in one direction to the motor and conduction of the other thyristor passes power in the other direction to the motor, and the time of conduction of each thyristor in each half-cycle of energy at the power line frequency determines the amount of power transferred to the motor during that respective half-cycle, and in which the countdown circuit comprises a multivibrator circuit having its output connections coupled to the gate circuit, such that the state of the multivibrator determines which of the two thyristors can be gated on and thus determines the direction of power transfer to the motor at any given time, and the countdown circuit further comprises a frequency control circuit, having its output connections coupled to the multivibrator circuit to regulate the timing of the multivibrator, which frequency control circuit has at least one adjustable component to determine the periodicity of the multivibrator circuit.

7. An a-c motor speed control system as claimed in claim 6 and further comprising a rectifier bridge circuit, coupled between the a-c power line and each of the voltage control, multivibrator, and frequency control circuits, to insure synchronization of said circuits with the fundamental line frequency of the power supplied over the a-c power line.

8. The method of controlling the speed of an a-c motor energized from a power line providing single-phase a-c electrical power alternating at a substantially constant fundamental frequency, which method employs only a single bidirectional switch connected to operate the motor either at a reference speed related to the fundamental line frequency or at a lower speed than would result from supplying power at said fundamental line frequency, comprising the steps of:
   gating to the motor through the single bidirectional switch at least part of a number of the positive fundamental frequency half-cyles, but none of the negative half-cycles, of the single-phase a-c power, which number is a whole number equal to or greater than one; and
   thereafter gating to the motor through the single bidirectional switch at least part of a number of the negative frequency half-cyles, but none of the positive half-cycles, of the single-phase a-c power, which number is a whole number equal to or greater than one, said gating of at least part of the half-cycles supplying the only a-c power gated from the power line to the motor, thus delivering to the motor a resultant alternating power at a frequency either equal to the fundamental frequency or equal to a subharmonic frequency of the fundamental frequency, and thus correspondingly regulating the motor speed.

* * * * *